United States Patent
Bugossi et al.

(10) Patent No.: US 11,720,245 B1
(45) Date of Patent: *Aug. 8, 2023

(54) USER INTERFACE INFORMATION ENHANCEMENT BASED ON USER DISTANCE

(71) Applicant: Meta Platforms, Inc., Menlo Park, CA (US)

(72) Inventors: Mattia Bugossi, San Francisco, CA (US); Alón Reich Zilberman, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/549,504

(22) Filed: Dec. 13, 2021

Related U.S. Application Data

(63) Continuation of application No. 16/816,202, filed on Mar. 11, 2020, now Pat. No. 11,249,637.

(51) Int. Cl.
    *G06F 3/0487* (2013.01)
    *G06T 7/70* (2017.01)
    *G06T 7/50* (2017.01)
    *G06V 40/10* (2022.01)

(52) U.S. Cl.
    CPC .............. *G06F 3/0487* (2013.01); *G06T 7/50* (2017.01); *G06T 7/70* (2017.01); *G06V 40/10* (2022.01)

(58) Field of Classification Search
    CPC G06F 3/0487; G06T 7/50; G06T 7/70; G06V 40/10
    See application file for complete search history.

(56) References Cited

U.S. PATENT DOCUMENTS

| | | |
|---|---|---|
| 9,507,755 B1 | 11/2016 | Kerzner |
| 2015/0370323 A1 | 12/2015 | Cieplinski et al. |
| 2017/0272649 A1* | 9/2017 | Liu ........................ H04N 7/188 |
| 2018/0188892 A1 | 7/2018 | Levac et al. |
| 2019/0073592 A1* | 3/2019 | Luo ........................ G06N 3/084 |
| 2019/0073593 A1* | 3/2019 | Luo ........................ G06N 3/088 |
| 2019/0172091 A1 | 6/2019 | Pateel et al. |
| 2019/0355129 A1 | 11/2019 | Hsu |
| 2020/0133385 A1 | 4/2020 | Hsu |

* cited by examiner

*Primary Examiner* — Jeffery A Brier

(74) *Attorney, Agent, or Firm* — Fenwick & West LLP

(57) ABSTRACT

A computing device enhances digital content on a display based on a distance to an individual from the computing device. The computing device detects an individual in the environment around the computing device and determines a distance from the computing device to the individual. The computing device enhances the information included in the digital content when the distance is within a first threshold distance from the computing device. Similarly, the computing device removes information included in the digital content when the distance is outside of a second threshold distance from the computing device.

20 Claims, 6 Drawing Sheets

USER INTERFACE INFORMATION ENHANCEMENT BASED ON USER DISTANCE

CROSS REFERENCE TO RELATED APPLICATIONS

This application is a continuation of U.S. application Ser. No. 16/816,202, filed Mar. 11, 2020, which is incorporated by reference in its entirety.

BACKGROUND

Devices such as in-home smart assistants, phone systems, or video conferencing systems are often used to host and display content. These shared devices may be used in common spaces with multiple individuals, and as such, may display content intended to be viewed by individuals under a variety of circumstances.

SUMMARY

This disclosure relates generally to displaying digital content by a computing device, and more particularly to enhancing the information included in displayed digital content based on the proximity of an individual to the device. The computing device enhances the information included in the digital content when an individual is detected within a first threshold distance from the computing device. Similarly, the computing device removes information included in the digital content when a detected individual is beyond a second threshold distance from the computing device.

A computing device detects an individual (e.g. a device user) in the environment around the device. At a first detection time, the computing device determines a first distance from the computing device to the detected individual and compares the first distance to a first threshold distance. In response to determining that the first distance is greater than the first threshold distance, the computing device displays first digital content on a display of the computing device (e.g. an LED display). At a second detection time, the computing device determines a second distance between the first user and the computing device and compares the first distance to a second threshold distance. In response to determining that the second distance is less than the second threshold distance, the computing device displays second digital content on the display which includes at least one additional element relative to the first digital content.

In some embodiments, the computing device detects multiple users in the environment around the computing device. In this case, the computing device may use the distance corresponding to a particular detected individual, such as the individual closest to the computing device, to determine what content should be displayed on the user interface.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
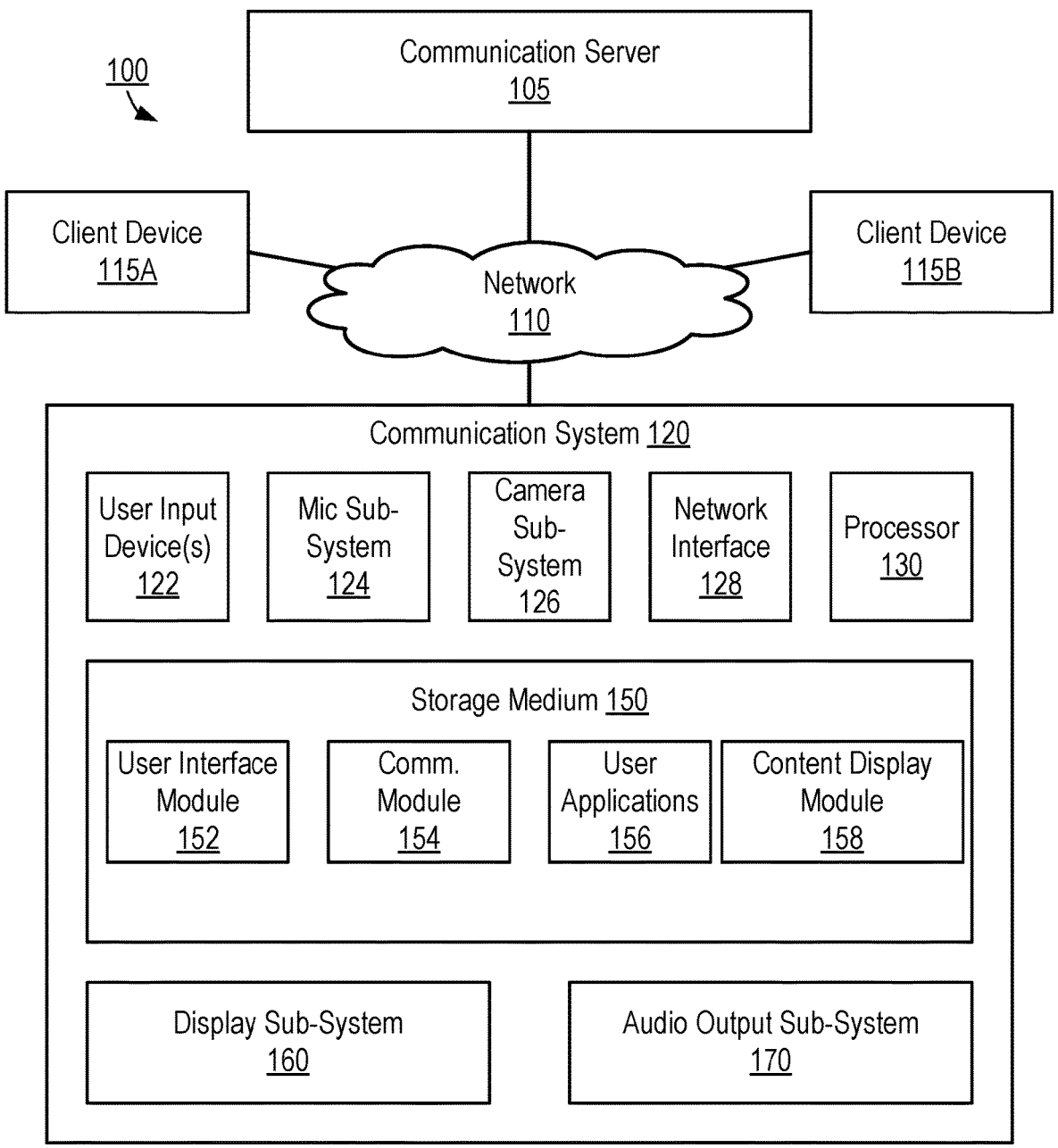
FIG. 1 is a block diagram of a system environment for a communication system, in accordance with an embodiment.

FIG. 1 is a block diagram of a system environment 100 for a communication system 120. The system environment 100 includes a communication server 105, one or more client devices 115 (e.g., client devices 115A, 115B), a network 110, and a communication system 120. In alternative configurations, different and/or additional components may be included in the system environment 100. For example, the system environment 100 may include additional client devices 115, additional communication servers 105, or additional communication systems 120.

In an embodiment, the communication system 120 comprises an integrated computing device that operates as a standalone network-enabled device. In another embodiment, the communication system 120 comprises a computing device for coupling to an external media device such as a television or other external display and/or audio output system. In this embodiment, the communication system may couple to the external media device via a wireless interface or wired interface (e.g., an HDMI cable) and may utilize various functions of the external media device such as its display, speakers, and input devices. Here, the communication system 120 may be configured to be compatible with a generic external media device that does not have specialized software, firmware, or hardware specifically for interacting with the communication system 120.

The client devices 115 are one or more computing devices capable of receiving user input as well as transmitting and/or receiving data via the network 110. In one embodiment, a client device 115 is a conventional computer system, such as a desktop or a laptop computer. Alternatively, a client device 115 may be a device having computer functionality, such as a personal digital assistant (PDA), a mobile telephone, a smartphone, a tablet, an Internet of Things (IoT) device, a video conferencing device, another instance of the communication system 120, or another suitable device. A client device 115 is configured to communicate via the network 110. In one embodiment, a client device 115 executes an application allowing a user of the client device 115 to interact with the communication system 120 by enabling voice calls, video calls, data sharing, or other interactions. For example, a client device 115 executes a browser application to enable interactions between the client device 115 and the communication system 105 via the network 110. In another embodiment, a client device 115 interacts with the communication system 105 through an application running on a native operating system of the client device 115, such as IOS® or ANDROID™.

The communication server 105 facilitates communications of the client devices 115 and the communication system 120 over the network 110. For example, the communication server 105 may facilitate connections between the communication system 120 and a client device 115 when a voice or video call is requested. Additionally, the communication server 105 may control access of the communication system 120 to various external applications or services available over the network 110. In an embodiment, the communication server 105 may provide updates to the communication system 120 when new versions of software or firmware become available. In other embodiments, various functions described below as being attributed to the communication system 120 can instead be performed entirely or in part on the communication server 105. For example, in some embodiments, various processing or storage tasks may be offloaded from the communication system 120 and instead performed on the communication server 120.

The network 110 may comprise any combination of local area and/or wide area networks, using wired and/or wireless communication systems. In one embodiment, the network 110 uses standard communications technologies and/or protocols. For example, the network 110 includes communication links using technologies such as Ethernet, 802.11 (WiFi), worldwide interoperability for microwave access (WiMAX), 3G, 4G, 5G, code division multiple access (CDMA), digital subscriber line (DSL), Bluetooth, Near Field Communication (NFC), Universal Serial Bus (USB), or any combination of protocols. In some embodiments, all or some of the communication links of the network 110 may be encrypted using any suitable technique or techniques.

The communication system 120 includes one or more user input devices 122, a microphone sub-system 124, a camera sub-system 126, a network interface 128, a processor 130, a storage medium 150, a display sub-system 160, and an audio sub-system 170. In other embodiments, the communication system 120 may include additional, fewer, or different components.

The user input device 122 comprises hardware that enables a user to interact with the communication system 120. The user input device 122 can comprise, for example, a touchscreen interface, a game controller, a keyboard, a mouse, a joystick, a voice command controller, a gesture recognition controller, a remote control receiver, or other input device. In an embodiment, the user input device 122 may include a remote control device that is physically separate from the user input device 122 and interacts with a remote controller receiver (e.g., an infrared (IR) or other wireless receiver) that may integrated with or otherwise connected to the communication system 120. In some embodiments, the display sub-system 160 and the user input device 122 are integrated together, such as in a touchscreen interface. In other embodiments, user inputs may be received over the network 110 from a client device 115. For example, an application executing on a client device 115 may send commands over the network 110 to control the communication system 120 based on user interactions with the client device 115. In other embodiments, the user input device 122 may include a port (e.g., an HDMI port) connected to an external television that enables user inputs to be received from the television responsive to user interactions with an input device of the television. For example, the television may send user input commands to the communication system 120 via a Consumer Electronics Control (CEC) protocol based on user inputs received by the television.

The microphone sub-system 124 comprises one or more microphones (or connections to external microphones) that capture ambient audio signals by converting sound into electrical signals that can be stored or processed by other components of the communication system 120. The captured audio signals may be transmitted to the client devices 115 during an audio/video call or in an audio/video message. Additionally, the captured audio signals may be processed to identify voice commands for controlling functions of the communication system 120. In an embodiment, the microphone sub-system 124 comprises one or more integrated microphones. Alternatively, the microphone sub-system 124 may comprise an external microphone coupled to the communication system 120 via a communication link (e.g., the network 110 or other direct communication link). The microphone sub-system 124 may comprise a single microphone or an array of microphones. In the case of a microphone array, the microphone sub-system 124 may process audio signals from multiple microphones to generate one or more beamformed audio channels each associated with a particular direction (or range of directions).

The camera sub-system 126 comprises one or more cameras (or connections to one or more external cameras) that captures images and/or video signals. The captured images or video may be sent to the client device 115 during a video call or in a multimedia message, or may be stored or processed by other components of the communication system 120. Furthermore, in an embodiment, the camera sub-system 126 or another component of communication system 120 processes images or video from the camera sub-system 126 to detect individual humans in the environment around the communication system 120. Additionally, images or video from the camera sub-system 126 may be processed for face detection, face recognition, gesture recognition, or other information that may be utilized to control functions of the communication system 120. In the same or different embodiment, the camera sub-system 126 or another component of communication system 120 may process the images or video from the camera sub-system 126 to determine the distance from the camera sub-system 126 to individuals detected in the environment. The camera sub-system 126 may make these detections and distance determinations available to other components of the communication system 120, such as through an Application Programming Interface (API). Human/facial detection and distance determination is discussed in greater detail below with reference to the content display module 158. In an embodiment, the camera sub-system 126 includes one or more wide-angle cameras for capturing a wide, panoramic, or spherical field of view of a surrounding environment. The camera sub-system 126 may include integrated processing to stitch together images from multiple cameras, or to perform image processing functions such as zooming, panning, de-warping, or other functions. In an embodiment, the camera sub-system 126 may include multiple cameras positioned to capture stereoscopic (e.g., three-dimensional images) or may include a depth camera to capture depth values for pixels in the captured images or video.

The network interface 128 facilitates connection of the communication system 120 to the network 110. For example, the network interface 130 may include software and/or hardware that facilitates communication of voice, video, and/or other data signals with one or more client devices 115 to enable voice and video calls or other operation of various applications executing on the communication system 120. The network interface 128 may operate according to any conventional wired or wireless communication protocols that enable it to communication over the network 110.

The display sub-system 160 comprises an electronic device or an interface to an electronic device for presenting images or video content (i.e. digital content). For example, the display sub-system 160 may comprises an LED display panel, an LCD display panel, a projector, a virtual reality headset, an augmented reality headset, another type of display device, or an interface for connecting to any of the above-described display devices. In an embodiment, the display sub-system 160 includes a display that is integrated with other components of the communication system 120. Alternatively, the display sub-system 120 comprises one or more ports (e.g., an HDMI port) that couples the communication system to an external display device (e.g., a television).

The audio output sub-system 170 comprises one or more speakers or an interface for coupling to one or more external speakers that generate ambient audio based on received audio signals. In an embodiment, the audio output sub-system 170 includes one or more speakers integrated with other components of the communication system 120. Alternatively, the audio output sub-system 170 comprises an interface (e.g., an HDMI interface or optical interface) for coupling the communication system 120 with one or more external speakers (for example, a dedicated speaker system or television). The audio output sub-system 120 may output audio in multiple channels to generate beamformed audio signals that give the listener a sense of directionality associated with the audio. For example, the audio output sub-system may generate audio output as a stereo audio output or a multi-channel audio output such as 2.1, 3.1, 5.1, 7.1, or other standard configuration.

In embodiments in which the communication system 120 is coupled to an external media device such as a television, the communication system 120 may lack an integrated display and/or an integrated speaker, and may instead only communicate audio/visual data for outputting via a display and speaker system of the external media device.

The processor 130 operates in conjunction with the storage medium 150 (e.g., a non-transitory computer-readable storage medium) to carry out various functions attributed to the communication system 120 described herein. For example, the storage medium 150 may store one or more modules or applications (e.g., user interface 152, communication module 154, user applications 156, user management module 158) embodied as instructions executable by the processor 130. The instructions, when executed by the processor, cause the processor 130 to carry out the functions attributed to the various modules or applications described herein. In an embodiment, the processor 130 may comprise a single processor or a multi-processor system.

In an embodiment, the storage medium 150 comprises a user interface module 152, a communication module 154, user applications, and user management module 158. In alternative embodiments, the storage medium 150 may comprise different or additional components.

The user interface module 152 comprises visual and/or audio elements and controls for enabling user interaction with the communication system 120. For example, the user interface module 152 may receive inputs from the user input device 122 to enable the user to select various functions of the communication system 120. In an example embodiment, the user interface module 152 includes a calling interface to enable the communication system 120 to make or receive voice and/or video calls over the network 110. To make a call, the user interface module 152 may provide controls to enable a user to select one or more contacts for calling, to initiate the call, to control various functions during the call, and to end the call. To receive a call, the user interface module 152 may provide controls to enable a user to accept an incoming call, to control various functions during the call, and to end the call. For video calls, the user interface module 152 may include a video call interface that displays remote video from a client 115 together with various control elements such as volume control, an end call control, or various controls relating to how the received video is displayed or the received audio is output.

The user interface module 152 may furthermore enable a user to access user applications 156 or to control various settings of the communication system 120. In an embodiment, the user interface module 152 may enable customization of the user interface according to user preferences. Here, the user interface module 152 may store different preferences for different users of the communication system 120 and may adjust settings depending on the current user.

The communication module 154 facilitates communications of the communication system 120 with clients 115 for voice and/or video calls. For example, the communication module 154 may maintain a directory of contacts and facilitate connections to those contacts in response to commands from the user interface module 152 to initiate a call. Furthermore, the communication module 154 may receive indications of incoming calls and interact with the user interface module 152 to facilitate reception of the incoming call. The communication module 154 may furthermore process incoming and outgoing voice and/or video signals during calls to maintain a robust connection and to facilitate various in-call functions.

The user applications 156 comprise one or more applications that may be accessible by a user via the user interface module 152 to facilitate various functions of the communication system 120. For example, the user applications 156 may include a web browser for browsing web pages on the Internet, a picture viewer for viewing images, a media playback system for playing video or audio files, an intelligent virtual assistant for performing various tasks or services in response to user requests, or other applications for performing various functions. In an embodiment, the user applications 156 includes a social networking application that enables integration of the communication system 120 with a user's social networking account. Here, for example, the communication system 120 may obtain various information from the user's social networking account to facilitate a more personalized user experience. Furthermore, the communication system 120 can enable the user to directly interact with the social network by viewing or creating posts, accessing feeds, interacting with friends, etc. Additionally, based on the user preferences, the social networking application may facilitate retrieval of various alerts or notifications that may be of interest to the user relating to activity on the social network. In an embodiment, users may add or remove applications 156 to customize operation of the communication system 120.

The content display module 158 displays and modifies digital content on one or more displays of the display sub-system 160. In particular, the content display module 158 may update or modify the digital content displayed on display sub-system 160 based on input from the user interface module 152, the communications module 154, the user applications 156, the camera sub-system 126, or any other software or hardware component of communication system 120. For example, content display module 158 may receive a user input from the user interface module 152 and update the display sub-system 160 accordingly (e.g. displaying a webpage, displaying a home screen, displaying an icon, etc.). In some embodiments, the content display module 158 modifies digital content displayed on display sub-system 160 based on a distance from a physical component of the communication subsystem 120, such as a camera from the camera sub-system 126, to a human detected in the environment around the communication system 120. In alternative embodiments, the distance may be measured from an integrated display of the display sub-system 160, or from an external display with which the display sub-system 160 interfaces. The content display module 158 may present different digital content when a human is close to the communication system 120 display sub-system 126 than when a human is further from the display sub-system 160. For example, when a detected individual moves closer or further from the communication system, the content display module 158 may add or remove elements from the displayed digital content, adjust font sizes of displayed text, adjust the resolution of displayed objects, display an entirely different interface, or otherwise modify the displayed digital content. These embodiments are discussed in greater detail below with reference to FIGS. 2-4.

Figure 2:
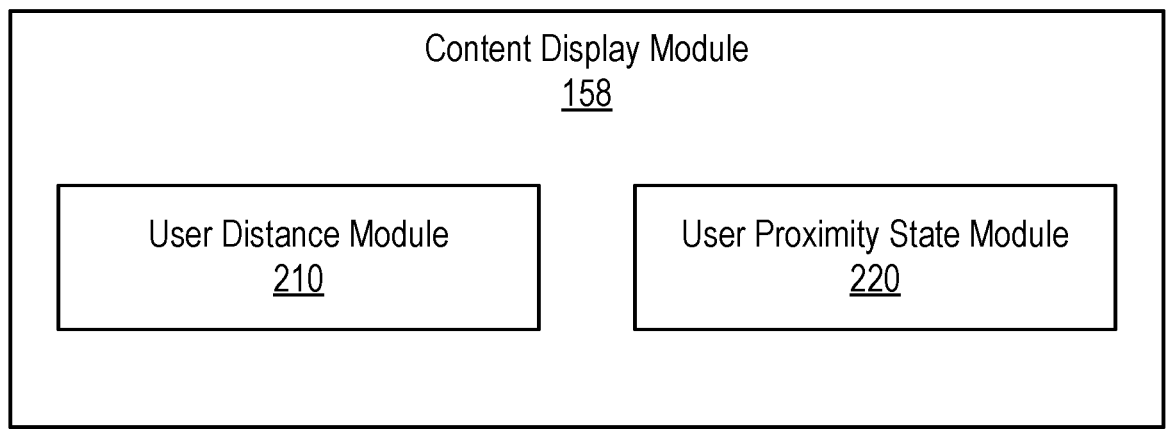
FIG. 2 is a block diagram of an example architecture for a user interface update module, according to an embodiment.

FIG. 2 illustrates an example embodiment of a content display module 158. In an embodiment, the content display module 158 comprises a user distance module 210 and a user proximity state module 220. In alternative embodiments, the content display module 158 may include different or additional components.

The user distance module 210 obtains a distance between the communication system 120 (or external display device) and an individual in the environment around the communication system 120. The user distance module 210 may receive the distance from the camera sub-sub system 160 or may compute it based on image or other sensor data. In an embodiment, the user distance module 210 may periodically query the camera sub-system 126 for a distance from the communication system 120 to a currently detected individual. Additionally, or alternatively, the user distance module 210 may subscribe to notifications from the camera sub-system indicating when an individual has been detected and the camera sub-system 126 may provide the distance to the detected individual together with the detection notification. The user distance module 210 may also receive additional information describing detected individual from the camera sub-system 126 (e.g. how recently the individual was detected, a confidence level for the detection, etc.). Communication between the user distance module 210 and the camera sub-system 126 may be facilitated by an API. The user distance module 210 may provide or otherwise make the received distances available to other components of the communication system 120 (e.g. the user proximity state module 220).

In alternative embodiments, the user distance module 210 performs detection of individuals in the environment and computes a distance to the individual based on data describing the environment around the communication system 120 obtained from another component of communication system 120 or a third-party system (e.g. client devices 115). In some embodiments, the user distance module 210 periodically attempts to detect individuals and determine the corresponding distances (e.g. once every second). In the same or different embodiments, the user distance module 210 attempts to detect individuals and determine corresponding distances in response to one or more triggering events. Triggering events may be a state change within the communication system 120, such as the communication device 120 being turned on or an application launching (e.g. one of the user applications 156). Triggering events may also be external events detected by the communication system 120, such as a user input (e.g. a voice command, a user interaction with digital content, or some other interaction with the user interface module 152) or a detected change in the environment (e.g. room lights coming on or a sound being detected). Furthermore, the user distance module 210 may attempt to detect individuals in response to a request from another component of the communication system 120, such as through an API function call.

In some embodiments, the user distance module 210 retrieves images or videos of the environment captured by one or more cameras of the camera sub-system 126. The user distance module may use one or more computer vision object detection algorithms (e.g. human detection, facial detection/recognition) to process the retrieved images and detect one or more individuals in the environment. For example, the user distance module 210 may use a machine learned model trained to detect humans in images, such as a convolutional neural network. As another example, the user distance module 210 may use other image processing or statistical techniques to detect humans in the images, such as a histogram of oriented gradients (HOG) based algorithm. In order to determine the distance to a detected individual, the user distance module 210 may detect an individual in images taken from multiple cameras in different positions and use a localization technique to determine the distance from the user to the communication system 120. For example, the user distance module 210 may solve a system of linear equations (e.g. using known camera poses and image pixel coordinates) for the position of the detected individual relative to the cameras. In other embodiments, the user distance module 210 may use a machine learned model to predict the position of the individual relative to the device based on one or more images in which the individual was detected.

In some embodiments, the user distance module 210 retrieves depth information from a depth sensor component of the communication system 120. For example, the camera sub-system 126 may include one or more depth sensors which capture depth maps of the environment around communication system 120. The user distance module 210 may use these depth maps to determine the distance to an individual detected in images as described above. Additionally, the user distance module may use the depth maps to both detect individuals and determine the corresponding distance. In an alternative embodiment, the camera sub-system 126 detects and/or determines the distance to detected individuals using the one or more depth sensors.

The user distance module 210 may detect multiple individuals in the environment around the communication system 120. For example, the user distance module 210 may detect two individuals in an image captured by the camera sub-system 126 and may obtain the distance to both detected individuals. The user distance module 210 may also output a representative distance or set of distances corresponding to detected individuals based on one or more rules. For example, the user distance module 210 may only output the distance to the individual closest to the device (i.e. the smallest distance), or the distance to the individual furthest from the device (i.e. the largest distance). In alternative embodiments, the user distance module 210 outputs the distances of each detected individual to other components of the communication system 120 or a representative distance computed as a function of the multiple detected distances (e.g., an average distance).

The user proximity state module 220 updates a state of the content display module 158 based on the detected distance to an individual. In one embodiment, the user proximity state module 220 periodically queries the user distance module 210 (e.g. via an API) to determine if an individual is detected in the environment around the communication system 120, and if so, obtains the distance to the detected individual from the communication system 120. In the same or different embodiment, the user distance module 210 automatically sends a distance to the user proximity state module 220 whenever an updated distance is detected (e.g. a new individual is detected, or a new distance is determined for a previously detected individual). Based on the obtained distance, the user proximity state module 220 updates a state of the content display module 158 reflecting the proximity of an individual to the communication system 120. For example, the state of the content display module may indicate that an individual is near to the communication system 120, or may conversely indicate that an individual is far from the communication system 120.

The state of the content display module 158 may be accessible to applications of the communication system 120 (e.g. the user applications 156), and these applications may control the display of certain digital content on the display sub-system 156 based on the state of the content display module 158. For example, applications may display certain digital content (e.g. interfaces for receiving user interaction, interfaces for presenting content to users, interfaces for both user interaction and presentation, etc.) depending on a current state of operation (e.g. a user is currently interacting with the application or a user is observing digital content). The user proximity state module 220 may communicate with one or more applications of communication system 120 to provide the state of the content display module 158 indicating the proximity of a currently detected individual (e.g. an individual is relatively close or an individual is relatively far away) and the application may display digital content based on the individual's proximity. For example, an application may adjust or otherwise control the display of currently displayed digital content based on the proximity of the detected individual or may instead leave the currently displayed digital content unchanged.

In one embodiment, the user proximity state module 220 stores and uses a single threshold distance for performing distance-based digital content adjustment. In this case, the user proximity state module 220 may modify a proximity indicator corresponding to the state of the content display module 158 describing whether the distance to a detected individual is less than or greater than the threshold distance (e.g. a Boolean or other state variable). Based on modification of the proximity indicator, one or more of the applications may display certain digital content or adjust currently displayed digital content. For example, an application may display digital content including elements which convey information that can generally be understood from a distance less than the threshold distance (e.g. 2 meters or less) when an individual is near the communication system 120. Similarly, an application may display digital content including elements which convey information that can generally be understood from a distance beyond the threshold distance (e.g. more than 2 meters) when an individual is far from the communication system 120.

Furthermore, the user proximity state module 220 may employ various techniques which prevent the displayed content from being rapidly altered when an individual is at a distance very near the threshold distance. In one embodiment, the user proximity state module 220 modifies the proximity indicator only when a received distance to a detected individual is greater than or less than the threshold distance by a margin (e.g. the distance changes to at least 0.2 meters over or under the threshold). In the same or different embodiment, the user proximity state module 220 requires a certain amount of time to elapse before modifying the proximity indicator or adjusting displayed digital content based on instructions from applications (e.g. 5 seconds).

In alternative embodiments, the user proximity state module 220 stores and uses multiple threshold distances, such as a near threshold distance and a far threshold distance, where the near threshold distance is smaller than the far threshold distance. In this case, the user proximity state module 220 may modify the proximity indicator to indicate when a detected individual is closer than the near threshold distance, and similarly may modify the proximity indicator to indicate when the detected individual is further than the far threshold distance. As described above for a single threshold distance, one or more applications may display or adjust digital content based on updates to the proximity indicator in relation to the near and far threshold distances. For example, an application may display digital content including elements which convey information that can generally be understood from a distance less than the near threshold distance (e.g. 2 meters or less) when an individual is near the communication system 120. Similarly, an application may display digital content including elements which convey information that can generally be understood from a distance beyond the far threshold distance (e.g. 3 meters or more) when an individual is far from the communication system 120.

When using a near threshold and a far threshold, the communication system 120 does not necessarily modify the proximity indicator, or otherwise update or modify the content that is currently displayed (e.g. by the display sub-system 160), when an individual is detected at a distance between the near threshold distance and the far threshold distance, and instead maintains the previous display state. In doing so, the communication system 120 does not abruptly adjust currently displayed digital content when an individual is standing at a distance from the communication system 120 which is approximately the near threshold distance or the far threshold distance.

In some embodiments, digital content displayed when a detected individual is near the communication system 120 contains additional elements relative to digital content displayed when a detected individual is far from the communication system 120. For example, digital content displayed when an individual is near may be a home screen interface including a user's name, the current time, and the user's calendar, while digital content displayed when an individual is far may be the same home screen interface without the calendar. In the same or different embodiment, digital content displayed when an individual is far may adjust for ease of use and/or viewing when an individual is near, and vice versa. For example, the size of buttons may increase, or the font size of text may increase when an individual is near. In the same or different embodiments, digital content displayed when an individual is near may include digital content intended for user interaction, while digital content displayed when an individual is far may include digital content intended primarily for viewing. For example, digital content displayed for far individuals might indicate an incoming call, while digital content displayed for near individuals might include a user interface element usable to answer the call. As another example, digital content displayed for near individuals might include advertisements, user surveys, and other promotional content intended for selection by a user.

In some embodiments, the communication system 120 allows users to adjust various parameters associated with distance-based information enhancement. For example, the user interface module 152 may provide a user interface by which the user can input a single threshold distance, a near threshold distance, a far threshold distance, and/or additional threshold distances to be used by the content display module 158 in displaying content. As another example, the user interface module 152 may provide a user interface by which the user can turn distance-based information enhancement on or off. As still another example, the user interface module 152 may provide a user interface by which the user can select one or more types of distance-based information enhancement, such as adding/removing content elements, resizing content elements, displaying promotional content, etc.

Modifying Displayed Content Based on User Distance

Figure 3A:
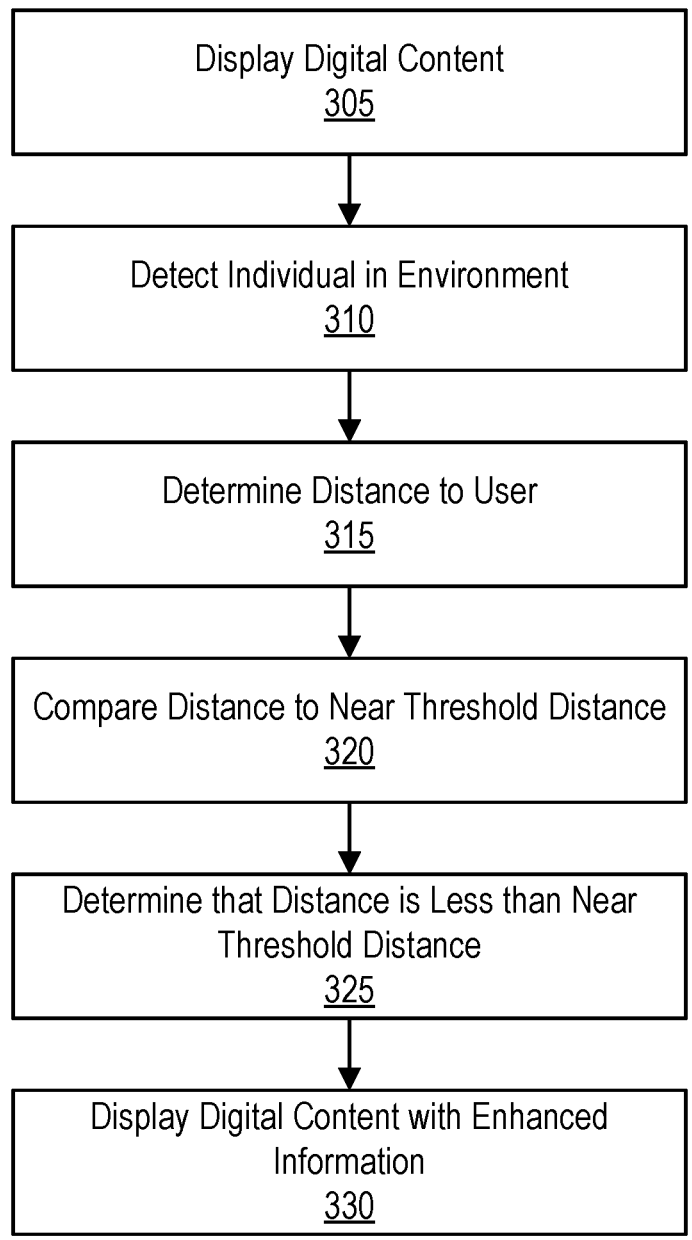
FIG. 3A is a flow diagram of a method for adjusting displayed digital content when an individual is less than a threshold distance from a computing device, in accordance with an embodiment.

FIG. 3A is a flow diagram of a method 300 for adjusting displayed digital content when an individual moves from a distance greater than a near threshold distance to a distance less than the near threshold distance, in accordance with an embodiment. The method 300 begins with the communication system 120 displaying 305 digital content on a display (e.g. a display of display sub-system 160) intended for an individual who is far from the communication system 120. For example, the content display module 158 (or a user application 156 corresponding to the digital content) may display digital content intended for far individuals by default when no individual has been detected in the environment around the communication system 120. As another example, the content display module 158 may display digital content intended for far individuals in response to determining that the distance to a detected individual was greater than a far threshold distance (e.g. as described below in reference to FIG. 3B).

At some time after displaying the digital content, the communication system 120 detects 310 an individual in the environment around the communication system 120. For example, the user distance module 210 may input images captured by the camera sub-system 126 into an object detection model and receive as output pixels classified as a human (e.g. as a labeled bounding box). In response to detecting the individual, the communication system 120 determines 315 the distance from the communication system 120 to the detected individual and compares 320 the distance to a near threshold distance. In the case that the communication system 120 determines 325 that the distance is less than the near threshold distance, the communication system 120 displays 330 digital content with enhanced information on the display intended for individuals near the communication system 120. For example, a user application 156 may add one or more additional elements to the originally displayed digital content, or may display an entirely different set of elements relative to the originally displayed content, after the content display module 158 state updates to indicate an individual is near. If the communication system 120 determines that the distance is not less than the near distance threshold, the communication system 120 may continue displaying the original content.

Figure 3B:
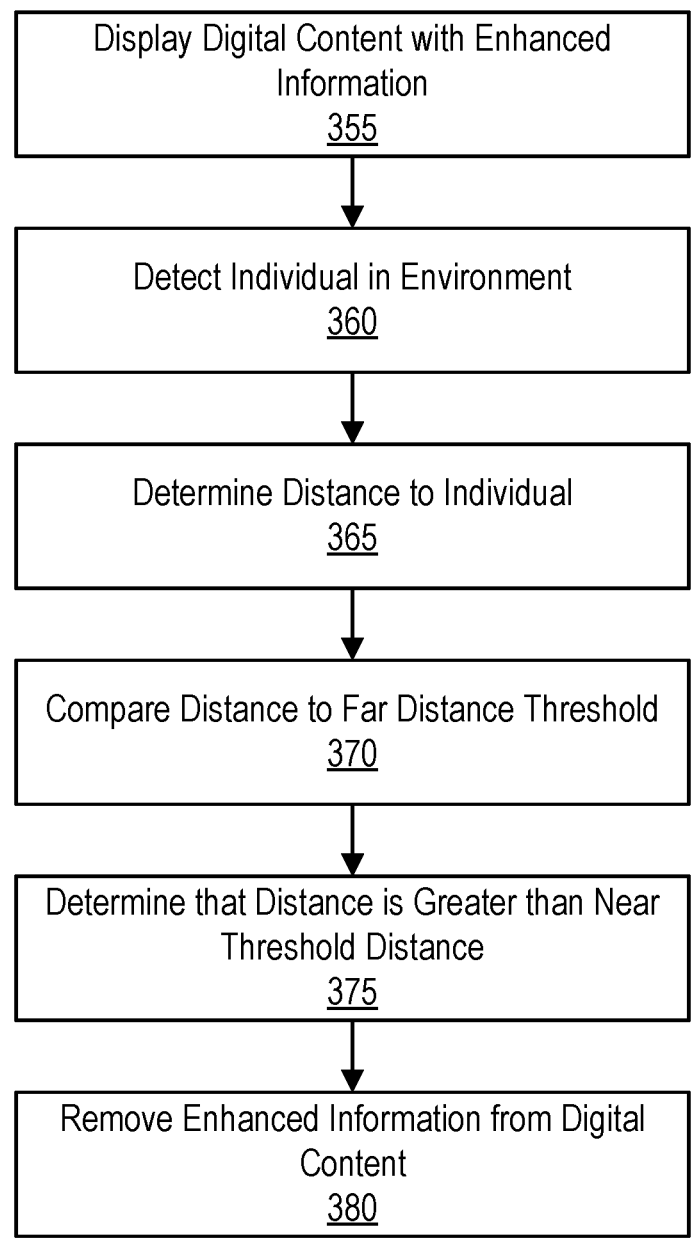
FIG. 3B is a flow diagram of a method for adjusting displayed digital content when an individual is greater than a threshold distance from a computing device, in accordance with an embodiment.

FIG. 3B is a flow diagram of a method 350 for adjusting displayed digital content when an individual moves from a distance less than a far distance threshold to a distance greater than the far threshold distance, in accordance with an embodiment. The method 350 begins with the communication system 120 displaying 355 digital content on a display (e.g. a display of display sub-system 160) including enhanced information and intended for an individual who is near the communication system 120. For example, the content display module 158 (or a user application 156 corresponding to the digital content) may display digital content intended for near individuals by default when no individual has been detected in the environment around the communication system 120. As another example, a user application 156 may display digital content intended for near individuals in response to the state of content display module 158 indicating that the distance to a detected individual is less than a near threshold distance (e.g. as described above in reference to FIG. 3A).

At some time after displaying the digital content, the communication system 120 detects 360 an individual in the environment around the communication system 120. For example, the communication system 120 may detect the same individual discussed above in reference to FIG. 3A at a second time, where the detection in FIG. 3A came at an earlier time than the detection in FIG. 3B at the second time. In response to detecting the individual, the communication system 120 determines 365 the distance from the communication system 120 to the detected individual and compares 370 the distance to a far threshold distance. In the case that the communication system 120 determines 375 that the distance is greater than the far threshold distance, the communication system 120 removes 380 the enhanced information from the digital content on the display. For example, a user application 156 may remove elements from the originally displayed digital content, or may display an entirely different set of elements relative to the original digital content, after the content display module 158 state updates to indicate an individual is far. If the communication system 120 determines that the distance is not greater than the far threshold distance, the communication system 120 may continue displaying the original digital content.

In either of method 300 or 350 described above, the communication system 120 may detect multiple individuals at an instance in time (e.g. in the same image), or within a time range (e.g. within 10 milliseconds). In one embodiment, the communication system 120 determines the distances from each of the detected individuals to the communication system 120 and compares the smallest distance (i.e. corresponding to the individual closest to the communication system 120) to the near threshold distance and the far threshold distance. In other embodiments, the communication system 120 uses one or more different criteria or processing techniques to determine which distances to consider when determining what digital content to display. For example, communication system 120 may compute the average distance of the determined distances and compare the average distance to the near and far threshold distances.

In some embodiments, the communication system 120 stores a set of threshold distances at various distance intervals from the communication system 120. For example, the communication system may have a threshold distance every two meters. In this case, the communication system 120 may display different content depending on which threshold distance a detected individual is nearest to or which threshold distances the user is in-between. For example, in relation to FIG. 3A and FIG. 3B, in addition to a near and far threshold distances the communication system 120 may store a middle threshold distance. In this case, the communication system 120 may display content intended for individuals who are between the near and far threshold distances when a detected individual is further than the near threshold distance but closer than the far threshold distance to the communication system 120.

Figure 4A:
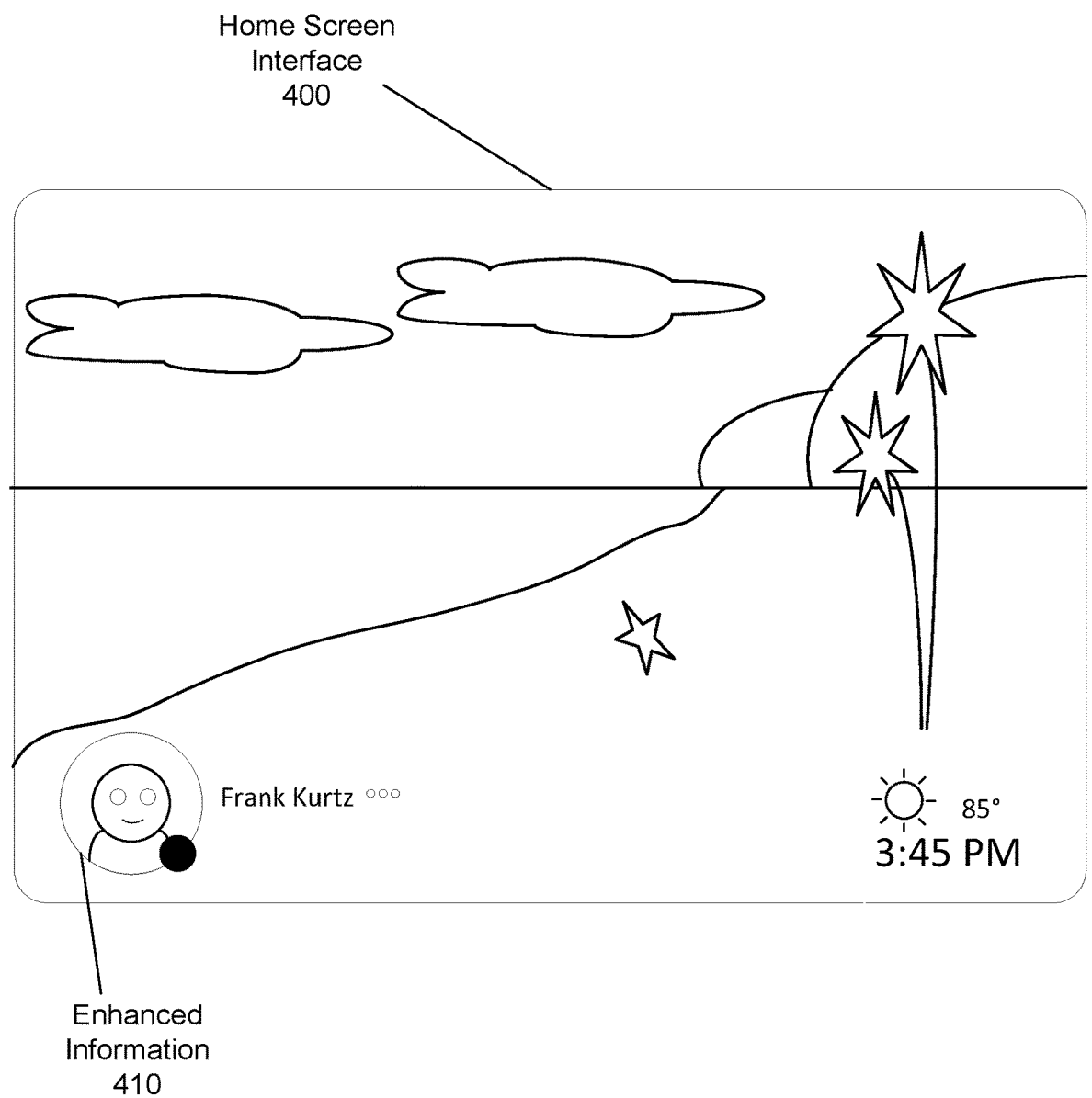
FIG. 4A illustrates a home screen interface displaying digital content including enhanced information, in accordance with an embodiment.

FIG. 4A illustrates a home screen interface 400 displaying digital content including enhanced information 410, in accordance with an embodiment. The enhanced information 410 includes a user's profile image and name on the left side of the home screen interface 400, while the remainder of the digital content includes the current weather and time on the right side and a beach landscape image in the background. The communication system 120 may display the home screen interface 400 using the display sub-system 160. For example, the content display module 158 may display the home screen interface 400 when the communication system 120 is turned on or otherwise becomes active after being in an inactive state (e.g. in sleep mode). Furthermore, the communication system 120 may display the home screen interface 400 with enhanced information 410 by default or in response to detecting an individual within the near threshold distance to the communication system 120, as described above in relation to FIG. 3A.

Figure 4B:
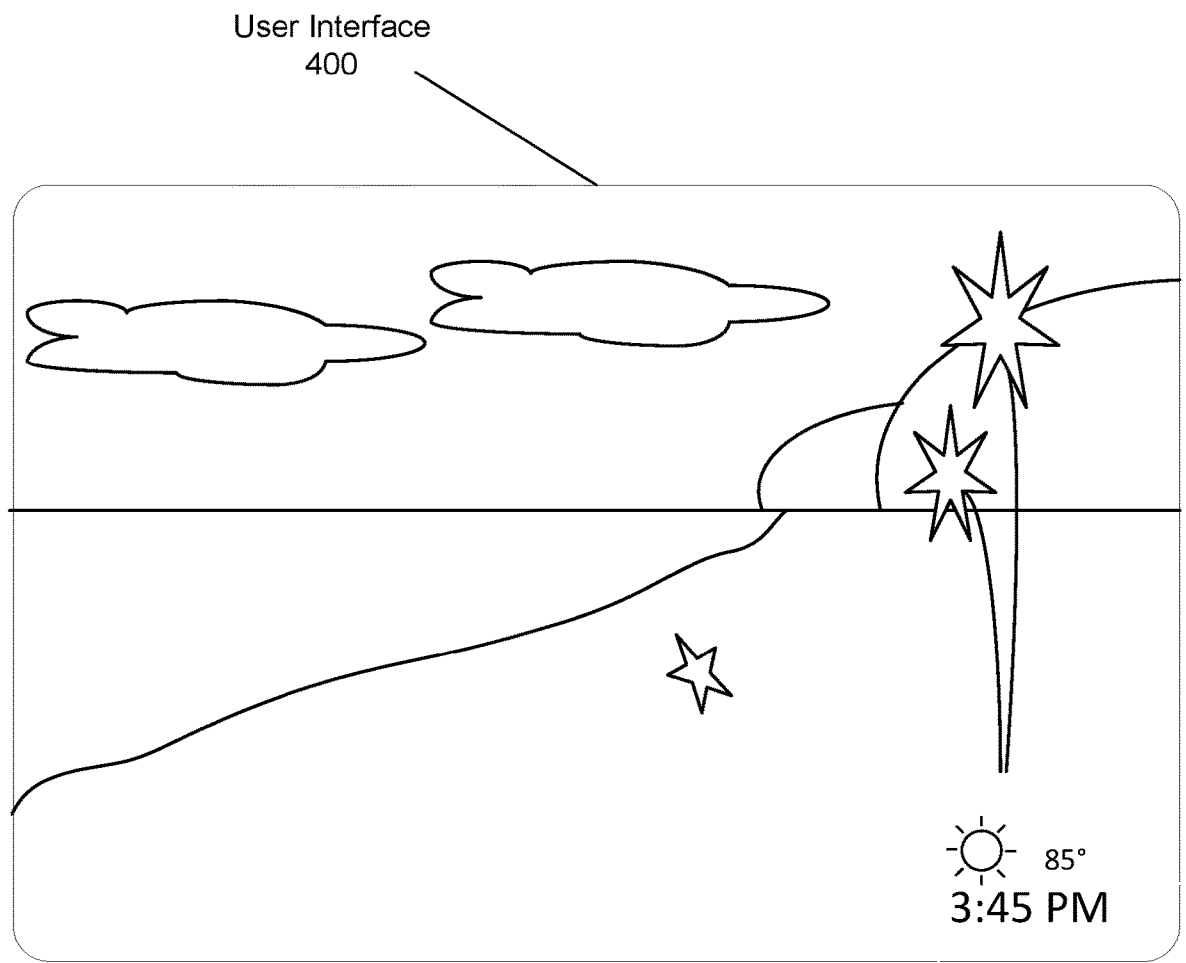
FIG. 4B illustrates a home screen interface displaying digital content without enhanced information, in accordance with an embodiment.

FIG. 4B illustrates the home screen interface 400 displaying digital content without enhanced information 410, in accordance with an embodiment. Relative to the digital content in FIG. 4A, the digital content in FIG. 4B includes the current weather information and the current time on the right side but does not include the user's profile image or name on the left side (i.e. enhanced information 410). The communication system 120 may display the home screen interface 400 without enhanced information 410 by default or in response to detecting an individual beyond the far threshold distance to the communication system 120, as described above in relation to FIG. 3B. Furthermore, the communication system 120 may alternate between displaying the enhanced information 410 in FIG. 4A and not displaying the enhanced information 410 in FIG. 4B based on either of the methods described above in relation to FIG. 3A and FIG. 3B, or any other methods for information enhancement discussed herein.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   detecting, by a computing device, an individual in an environment of the computing device at a first detection time;
   responsive to detecting the individual at the first detection time, displaying first digital content on a display of the computing device;
   determining, by the computing device, a distance between the individual and the computing device at a second detection time after the first detection time; and
   responsive to determining that the distance is less than a threshold distance, displaying second digital content on the display of the computing device, the second digital content including at least one additional element relative to the first digital content.

2. The method of claim 1, wherein the distance between the individual and the computing device is determined based on images of the environment received from a camera.

3. The method of claim 1, wherein the distance between the individual and the computing device is determined based on depth data received from a depth sensor.

4. The method of claim 1, wherein determining a distance between the individual and the computing device comprises:
   detecting a first individual in the environment;
   determining a first distance between the first individual and the computing device;
   detecting a second individual in the environment;
   determining a second distance between the second individual and the computing device; and determining the distance based on the first distance, the second distance, and one or more rules stored on the computing device.

5. The method of claim 4, wherein determining the distance comprises selecting, from the first distance and the second distance, a shortest distance as the distance.

6. The method of claim 4, wherein determining the distance comprises selecting, from the first distance and the second distance, a largest distance as the distance.

7. The method of claim 4, wherein determining the distance comprises computing an average distance based on the first distance and the second distance.

8. The method of claim 1, further comprising:
determining, by the computing device, another distance between the individual and the computing device at a third detection time after the second detection time;
responsive to determining that the third distance is greater than the first threshold distance, displaying third digital content on the display of the computing device, wherein the third digital content comprises at least one fewer element relative to the second digital content.

9. The method of claim 8, wherein the third digital content comprises the first digital content.

10. The method of claim 1, further comprising receiving the threshold distance from the user through a user interface presented by the computing device.

11. A non-transitory, computer-readable medium comprising instructions that, when executed by a processor, cause the processor to:
detect, by a computing device, an individual in an environment of the computing device at a first detection time;
responsive to detecting the individual at the first detection time, display first digital content on a display of the computing device;
determine, by the computing device, a distance between the individual and the computing device at a second detection time after the first detection time; and
responsive to determining that the distance is less than a threshold distance, display second digital content on the display of the computing device, the second digital content including at least one additional element relative to the first digital content.

12. The computer-readable medium of claim 11, wherein the distance between the individual and the computing device is determined based on images of the environment received from a camera.

13. The computer-readable medium of claim 11, wherein the distance between the individual and the computing device is determined based on depth data received from a depth sensor.

14. The computer-readable medium of claim 11, wherein determining a distance between the individual and the computing device comprises:
detecting a first individual in the environment;
determining a first distance between the first individual and the computing device;
detecting a second individual in the environment;
determining a second distance between the second individual and the computing device; and
determining the distance based on the first distance, the second distance, and one or more rules stored on the computing device.

15. The computer-readable medium of claim 14, wherein determining the distance comprises selecting, from the first distance and the second distance, a shortest distance as the distance.

16. The computer-readable medium of claim 14, wherein determining the distance comprises selecting, from the first distance and the second distance, a largest distance as the distance.

17. The computer-readable medium of claim 14, wherein determining the distance comprises computing an average distance based on the first distance and the second distance.

18. The computer-readable medium of claim 11, further comprising instructions that, when executed by the processor, cause the processor to:
determine, by the computing device, another distance between the individual and the computing device at a third detection time after the second detection time;
responsive to determining that the third distance is greater than the first threshold distance, display third digital content on the display of the computing device, wherein the third digital content comprises at least one fewer element relative to the second digital content.

19. The computer-readable medium of claim 18, wherein the third digital content comprises the first digital content.

20. The computer-readable medium of claim 11, further comprising receiving the threshold distance from the user through a user interface presented by the computing device.

* * * * *